US006606232B1

(12) United States Patent
Vo et al.

(10) Patent No.: US 6,606,232 B1
(45) Date of Patent: Aug. 12, 2003

(54) FAILSAFE SURGE PROTECTOR HAVING REDUCED PART COUNT

(75) Inventors: Chanh C. Vo, Arlington, TX (US); Brad N. Grunwald, Euless, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/109,214

(22) Filed: Mar. 28, 2002

(51) Int. Cl.[7] .................................................. H02H 9/04
(52) U.S. Cl. ........................................ 361/119; 361/118
(58) Field of Search .................................. 361/115–120

(56) References Cited

U.S. PATENT DOCUMENTS

| | | | | |
|---|---|---|---|---|
| 3,993,933 A | | 11/1976 | Menninga | 317/62 |
| 4,241,374 A | | 12/1980 | Gilberts | 361/124 |
| 4,249,224 A | | 2/1981 | Baumbach | 361/124 |
| 4,502,087 A | | 2/1985 | Huvet | 361/119 |
| 4,876,626 A | * | 10/1989 | Kaczmarek | 337/32 |
| 4,984,125 A | | 1/1991 | Uwano | 361/124 |
| 5,027,100 A | | 6/1991 | Neuwirth et al. | 337/32 |
| 5,029,302 A | | 7/1991 | Masghati et al. | 337/32 |
| 5,388,023 A | | 2/1995 | Boy et al. | 361/129 |
| 5,410,596 A | | 4/1995 | Shannon et al. | 379/412 |
| 5,523,916 A | * | 6/1996 | Kaczmarek | 361/119 |
| 5,557,065 A | | 9/1996 | Brower et al. | 174/52.3 |
| 5,880,919 A | | 3/1999 | Napiorkowski et al. | 361/117 |
| 5,909,349 A | | 6/1999 | Brower et al. | 361/117 |
| 5,999,393 A | | 12/1999 | Brower | 361/117 |
| 6,025,982 A | | 2/2000 | Brower | 361/119 |
| 6,172,865 B1 | | 1/2001 | Boy et al. | 361/119 |
| 6,327,129 B1 | * | 12/2001 | Oertel et al. | 361/117 |

* cited by examiner

*Primary Examiner*—Brian Sircus
*Assistant Examiner*—Boris Benenson
(74) *Attorney, Agent, or Firm*—Christopher C. Dremann

(57) ABSTRACT

A failsafe surge protector having a reduced part count includes a line terminal, a gas tube assembly, at least one ground spring for biasing the gas tube assembly in the direction of the line terminal, and a ground terminal. The gas tube assembly includes a gas tube, a fusible solder pellet, a failsafe ground, an MOV, and an MOV spring. The surge protector provides a first electrical ground path from the line terminal to the ground terminal through the gas tube and the fusible solder pellet, and a second electrical ground path parallel to the first electrical ground path from the line terminal to the ground terminal through the MOV. When the fusible solder pellet melts, the ground spring biases the failsafe ground into electrical contact with the line terminal, thereby providing a short-circuit electrical path from the line terminal to the ground terminal through the failsafe ground.

12 Claims, 6 Drawing Sheets

FAILSAFE SURGE PROTECTOR HAVING REDUCED PART COUNT

BACKGROUND OF THE INVENTION

1. Field of the Invention

The present invention relates generally to surge protectors of the type commonly used on telecommunications lines to divert voltage surges to ground, and more particularly, to a failsafe surge protector having a reduced part count.

2. Description of the Related Art

Surge protectors are well known for protecting personnel and telecommunications equipment by diverting voltage surges, also known as overvoltages, on a telecommunications line to ground. Such surge protectors utilize various types of protection elements to divert unacceptable levels of voltage to ground, including an air gap, a gas tube, and a metal oxide varistor (MOV) or other solid state device (e.g., thyristor or bi-directional voltage switch). A surge protector utilizing a single protection element is sometimes reliable and provides sufficient protection against the level of voltage surges encountered. Oftentimes, however, a surge protector utilizing more than one type of protection element is required to provide redundancy or to improve the performance of the surge protector. For example, an MOV may be used in conjunction with a gas tube as a back-up protection device to provide continued protection to personnel and equipment in the event that the gas tube fails (e.g., the gas tube vents). When used as a back-up protection device, the MOV has a clamping voltage at a preselected current (e.g., 1 mA) that is greater than the DC breakdown voltage of the gas tube. An MOV may also be used in conjunction with a gas tube as a hybrid protection device to reduce the reaction time of the surge protector or to reduce the impulse breakdown voltage of the gas tube without permitting the MOV to burn out. When used as a hybrid protection device, the MOV has a clamping voltage at a preselected current (e.g., 1 mA) that is less than the DC breakdown voltage of the gas tube.

It is also known to provide surge protectors with a failsafe mode of operation. A surge protector provided with a failsafe mode of operation continues to protect personnel and equipment in the event that the primary protection element overheats, or both the primary protection element and the secondary protection element overheat. In a particular failsafe surge protector, the protector assembly is provided with a fusible element having a predetermined melt temperature. If the temperature of the fusible element reaches the predetermined melt temperature, the fusible element melts and provides an electrical short-circuit path between the telecommunications line and ground. A commonly utilized fusible element is a solder pellet made of a fluxed metal alloy that has a predictable melt temperature and transitions rapidly between the solid state and the liquid state. The melt temperature of the fusible element is selected based on the temperature at which the protection element overheats (or is otherwise rendered inoperable), the thermal conductivity of the protection element, and the location of the fusible element in the surge protector relative to the protection element.

A known failsafe surge protector including a gas tube, an MOV, and a fusible solder pellet for protecting the tip and ring conductors of a telecommunications line is shown in FIGS. 1A and 1B. The surge protector, indicated generally at 110, includes a non-conductive housing 112 defining an internal cavity. Tip and ring line terminals 114 extend outwardly from the cavity through openings formed in the top surface of the housing 112. Each line terminal 114 is threaded to receive fasteners 113 and spacers 115 for securing and separating one or more tip and ring wire pairs that are electrically connected to the line terminals 114. The surge protector 110 further includes a pair of voluted springs 116, a pair of gas tube assemblies 118 (FIG. 1A), a common ground cap 119, and a common ground terminal 120. The voluted springs 116, the gas tube assemblies 118 and the ground cap 119 are disposed within the cavity defined by the housing 112 and are secured within the cavity by the legs 121 of the ground terminal 120, which engage the underside of the ground cap 119 through openings formed at the bottom of the housing 112. The underside of the ground cap 119 and the legs 121 of the ground terminal are typically encased with a potting compound (not shown) to seal the internal cavity along the bottom of the housing 112 against environmental contaminants, such as dirt, dust and moisture.

Each voluted spring 116 is electrically connected to one of the tip and ring line terminals 114. The gas tube assemblies 118 include identical sets of tip terminal protection elements and ring terminal protection elements that are electrically connected to a common ground support 122 (FIG. 1B). Each set of protection elements includes a gas tube 124, a pair of opposed end caps 126, a fusible solder pellet 127, an MOV 128, and a failsafe MOV spring 129 having a first end 131 and a second end 133. An elastic retaining band 130 holds the failsafe MOV spring 129 in position apart from the ground support 122, thereby preventing a short-circuit between the line terminal 114 and the ground terminal 120 through the failsafe MOV spring 129, the ground support 122, and the ground cap 119. The gas tube assemblies 118 are electrically connected between the voluted springs 116 and the ground cap 119, which in turn is electrically connected to the ground terminal 120. Thus, each conductor secured on a tip or ring line terminal 114 is electrically connected to the ground terminal 120 through one of the voluted springs 116, the corresponding gas tube assembly 118, the ground support 122, the ground cap 119, and the ground terminal 120.

The gas tube 124 is disposed between the ground support 122 and the failsafe MOV spring 129. The gas tube 124 has a first electrode 132 electrically connected to the ground support 122, and a second electrode 134 spaced from the first electrode that is electrically connected to the first end 131 of the failsafe MOV spring 129 adjacent the voluted spring 116. Accordingly, the surge protector 110 provides a first electrical ground path from the line terminal 114, through the voluted spring 116, through the first end 131 of the failsafe MOV spring 129, between the second electrode 134 and the first electrode 132 of the gas tube 124, through the ground support 122, through the ground cap 119, and out to the ground terminal 120.

The fusible solder pellet 127 and the MOV 128 are disposed between the opposed end caps 126. One of the end caps 126 is electrically connected to the ground support 122 while the other end cap 126 is electrically connected to the second end 133 of the failsafe MOV spring 129. Accordingly, the surge protector 110 provides a second electrical ground path from the line terminal 114, through the voluted spring 116, between the first end 131 and the second end 133 of the failsafe MOV spring 129, through the MOV 128 and the fusible solder pellet 127 between the opposed end caps 126, through the ground support 122, through the ground cap 119, and out to the ground terminal 120. The second electrical ground path is parallel to the first electrical ground path and diverts voltage surges to ground if the gas tube 124 fails (i.e., when the MOV 128 acts as a back-up protection device) or when the MOV 128 operates in conjunction with the gas tube 124 as a hybrid protection device.

In the event of a sustained voltage surge, the gas tube 124 and/or the MOV 128 will overheat, and thereby cause the fusible solder pellet 127 to melt. Once the fusible solder pellet 127 melts, the failsafe MOV spring 129 forces the outer edges of the opposed end caps 126 into contact with one another. Accordingly, the surge protector 110 provides an electrical short-circuit path parallel to both the first electrical ground path and the second electrical ground path from the line terminal 114, through the voluted spring 116, between the first end 131 and the second end 133 of the failsafe MOV spring 129, through the end caps 126, through the ground support 122, through the ground cap 119, and out to the ground terminal 120. Thus, the surge protector 110 provides three parallel electrical paths to divert voltage surges between one or more conductors on the tip and ring line terminals 114 and ground. The voltage surges may be carried to ground through the gas tube 124 along the first electrical ground path, through the MOV 128 and the fusible solder pellet 127 along the second electrical ground path, or may by-pass the gas tube 124, the MOV 128, and the fusible solder pellet 127 by traveling through the end caps 126 along the electrical short-circuit path. The MOV 128 may act as a back-up protection device, or may operate in conjunction with the gas tube 124 as a hybrid protection device to improve the performance of the surge protector 110.

The surge protector 110 is commonly referred to as a "station protection module" and is used within a protection, connection or termination enclosure, such as a network interface device (NID) or building entrance terminal (BET) on a telecommunications line to protect personnel and equipment from voltage surges caused, for example, by a lightening strike or power cross. Typically, a large number of telecommunications lines are interconnected within a NID or BET having significant volume constraints. As a result, it is desirable that the surge protector 110 for each telecommunication line occupies as little space as possible. A known shortcoming of such failsafe surge protectors is the large number of components that are required to adequately protect a telecommunications line. The number of components used to construct the failsafe surge protector 110 necessarily increases the space it occupies within a NID or BET. Furthermore, the number of components increases the complexity of the assembly process and the cost to manufacture the surge protector 110. Thus, it would be desirable to reduce the number of components (i.e., part count) used to construct the surge protector 110, thereby reducing the space (i.e., footprint) occupied by the surge protector within an interconnection enclosure, as well as the complexity of the assembly process and the cost to manufacture the surge protector. In addition, it is oftentimes necessary for each surge protector to provide redundancy or improved performance in addition to the failsafe mode of operation. What is needed is a failsafe surge protector having a reduced part count that may further include a secondary protection element to provide redundancy or to improve the performance of the surge protector.

BRIEF DESCRIPTION OF THE DRAWINGS

The accompanying drawings, in which like reference numerals in the various views represent the same or similar parts, are incorporated in and constitute a part of this specification, provide further understanding of the invention, illustrate various embodiments of the invention, and, together with the description, fully explain the principles and objectives thereof In the drawings.

DETAILED DESCRIPTION OF THE INVENTION

Figure 1B:
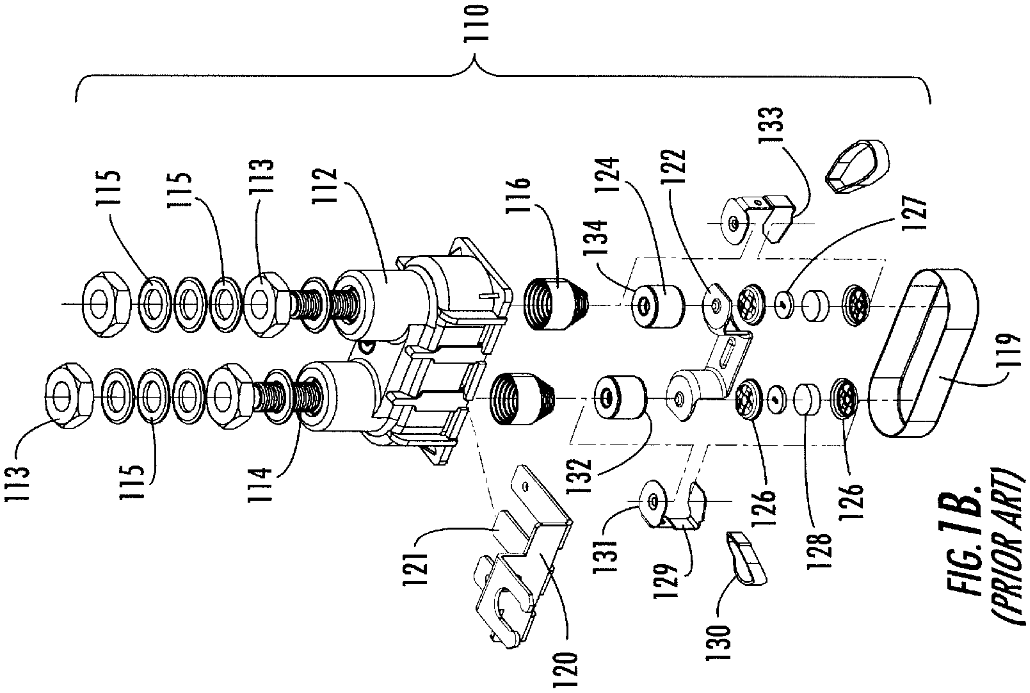
FIG. 1B. (PRIOR ART)
FIG. 1B is a fully exploded perspective view of the known failsafe surge protector of FIG. 1A.
Figure 1A:
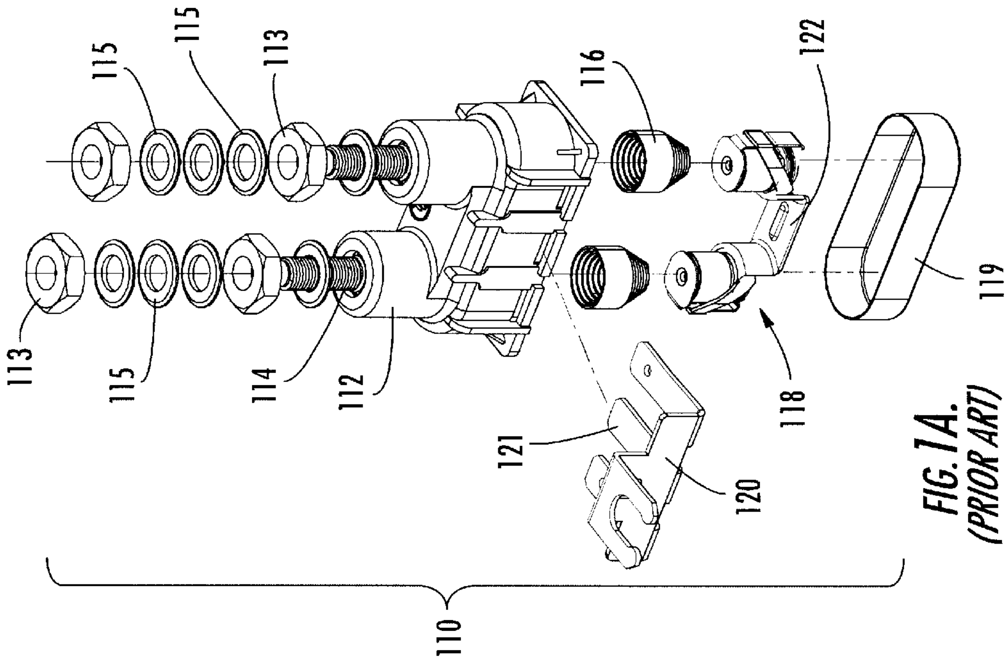
FIG. 1A. (PRIOR ART)
FIG. 1A is a partially exploded perspective view of a known failsafe surge protector including a gas tube assembly comprising a gas tube, an MOV, and a fusible solder pellet.
Figure 2B:
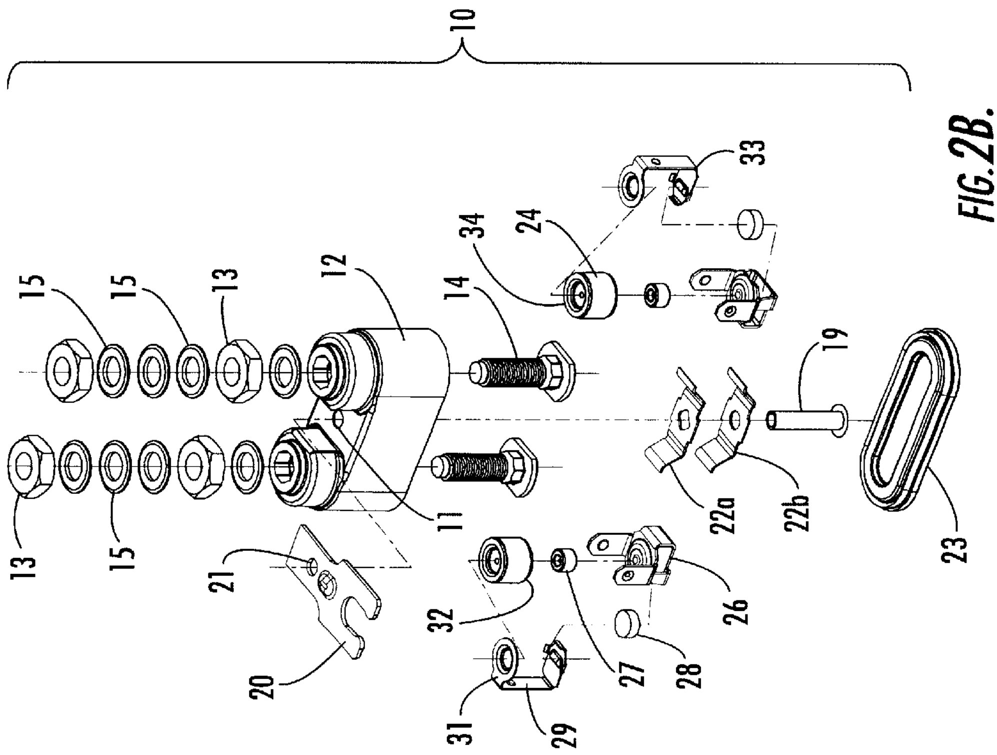
FIG. 2B is a fully exploded perspective view of the failsafe surge protector of FIG. 2A.
Figure 2A:
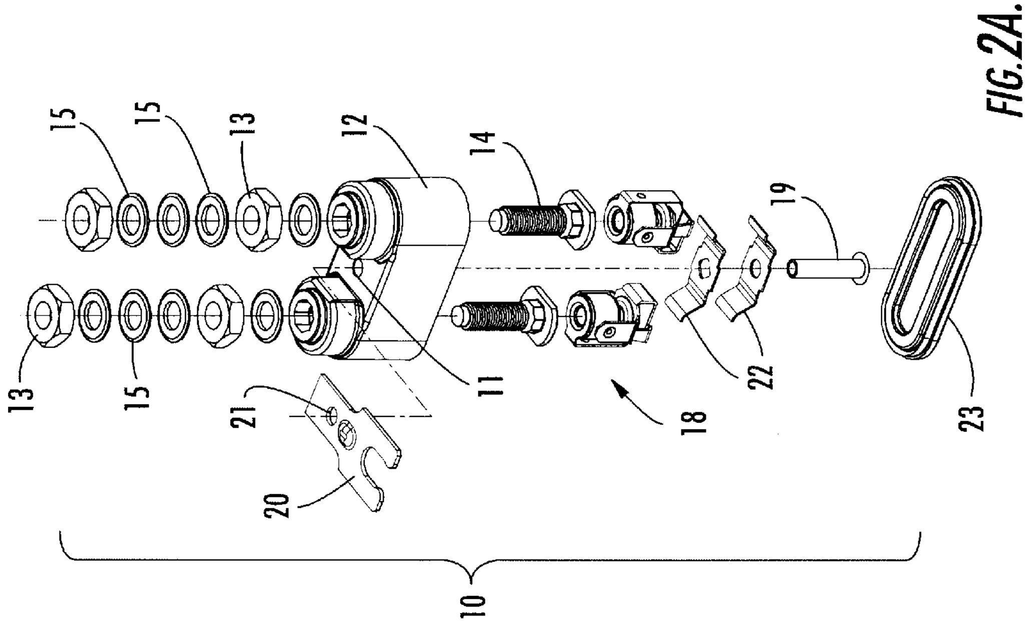
FIG. 2A is a partially exploded perspective view of a failsafe surge protector including a gas tube assembly having a reduced part count according to the invention.

The present invention is described more fully hereinafter with reference to the accompanying drawings, in which exemplary embodiments of the invention are shown. The invention may, however, be embodied in many different forms, and therefore, should not be construed as being limited to the embodiments described and shown herein. The illustrative embodiments are set forth herein so that this description will be thorough and complete, and will fully convey the intended scope of the invention, while enabling those skilled in the art to make and practice the invention without undue experimentation.

An exemplary embodiment of a failsafe surge protector having a reduced part count according to the invention is shown in FIGS. 2A, 2B, 3, 4, 5A, and 5B. The surge protector, indicated generally at 10, includes identical sets of protection elements for protecting the tip and ring conductors on a telecommunications line against voltage surges. In particular, the surge protector 10 includes a set of tip terminal protection elements and a set of ring terminal protection elements, each comprising a primary protection element, a secondary protection element and a fusible element, as will be described. The surge protector 10 comprises a non-conductive housing 12 defining an internal cavity. Tip and ring line terminals 14 extend outwardly from the cavity through openings formed in the top surface of the housing 12. Each line terminal 14 is threaded to receive fasteners 13 and spacers 15 for securing and separating one or more conductors (not shown) of a telecommunications line that are electrically connected to the line terminals 14. If desired, however, insulation displacement contact (IDC) connectors may be used in place of the line terminals 14, spacers 13 and fasteners 15 to electrically connect the conductors of the telecommunications line to the surge protector 10. Typically, the conductors are the tip and ring wire pairs of a copper telephone line and one or more tip wires are electrically connected to one of the line terminals 14, while a corresponding number of ring wires are electrically connected to the other line terminal 14. The telephone company tip and ring wires are secured on the line terminals 14 and interconnected with the premises tip and ring wires in a known manner to provide a plurality of telephone jacks on the telecommunications line within a residence, building, or other structure.

The surge protector 10 further comprises a pair of gas tube assemblies 18 (FIGS. 2A and 3), a common ground stud 19, a common ground terminal 20, and at least one common ground spring 22 for biasing the gas tube assemblies 18 in the direction of the line terminals 14. The gas tube assemblies 18, the ground stud 19, and the ground spring(s) 22 are disposed within the cavity defined by the housing 12 and are secured within the cavity by a non-conductive cover 23 affixed to the housing 12. Preferably, the cover 23 is affixed to the housing 12 in any manner that seals the internal cavity against environmental contaminants, such as dirt, dust and moisture. For example, the cover 23 may be affixed to the housing 12 by an adhesive or may be welded, such as by ultrasonic welding. However, the method for affixing the cover 23 to the housing 12 forms no part of the present invention. The ground terminal 20 is electrically connected to an earth ground in a conventional manner and affixed to the ground stud 19 in any manner that electrically connects the ground terminal 20 to the ground stud 19. For example, the housing 12 may be provided with an opening 11 and the ground terminal 20 may be provided with a like opening 21. The ground stud 19 is then inserted through an opening formed in the ground spring(s) 22, the opening 11 in the housing 12, and the opening 21 in the ground terminal 20. The ground terminal 20 may then be secured to the ground stud 19 by a fastener, such as a rivet, or by welding the ground stud 19 to the ground terminal 20. Alternatively, the ground stud 19 may be provided with a lip at one end adjacent the ground terminal 20. The other end of the ground stud 19 is inserted through the opening 21 in the ground terminal 20, the opening 11 in the housing 12, and the opening in the ground spring(s) 22 and then secured to the ground spring(s) 22 by a fastener, such as a rivet, or by welding. However, the method for affixing the ground terminal 20 to the ground stud 19, or the ground stud 19 to the ground spring(s) 22, forms no part of the present invention.

Figure 3:
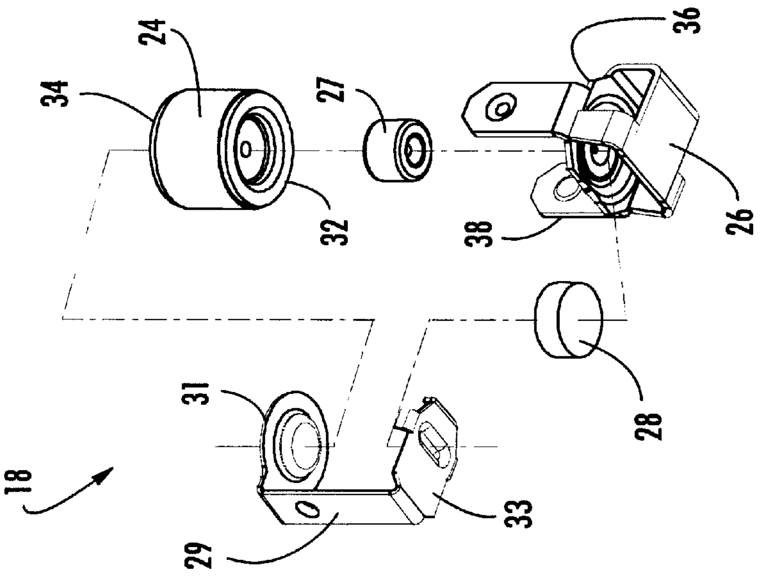
FIG. 3 is an exploded perspective view of the gas tube assembly of the failsafe surge protector of FIG. 2A.
Figure 8:
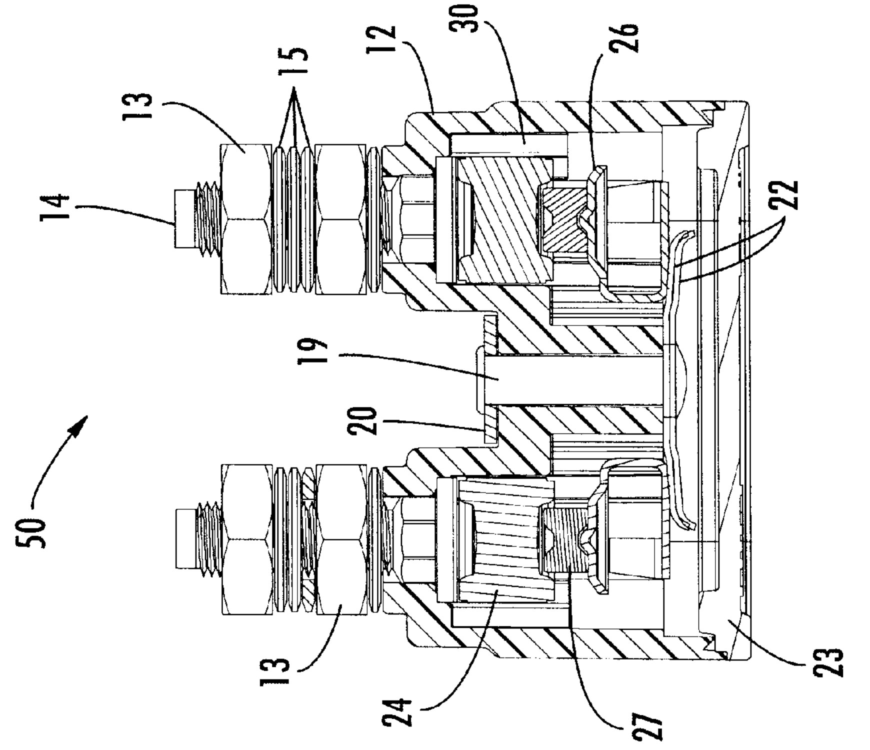
FIG. 8 is a sectional view of the failsafe surge protector of FIG. 6A, as assembled.
Figure 4:
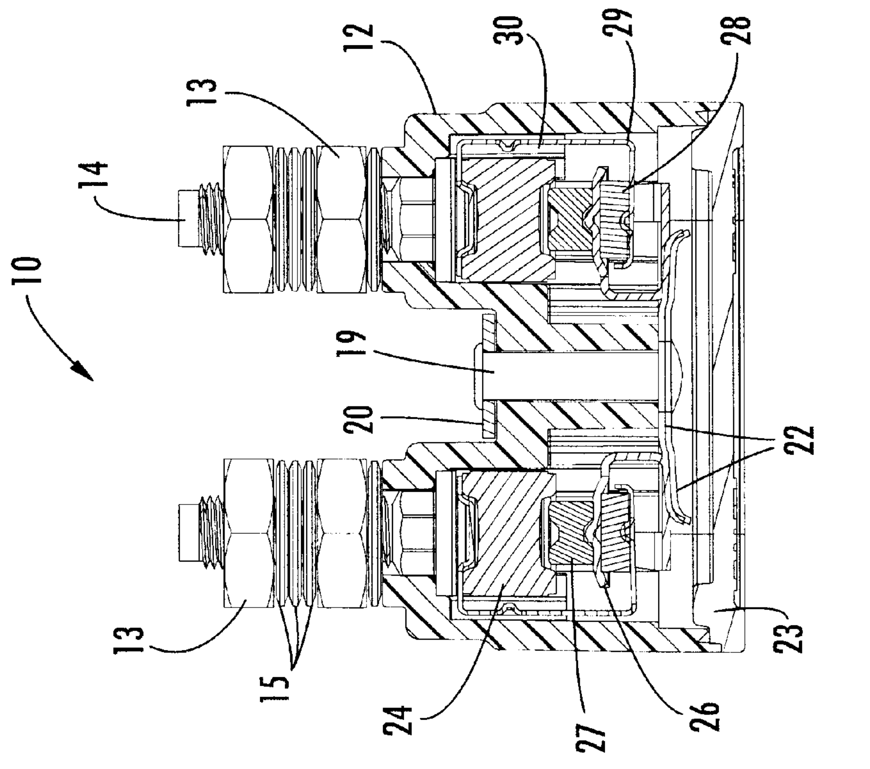
FIG. 4 is a sectional view of the failsafe surge protector of FIG. 2A, as assembled.

The gas tube assemblies 18 include tip terminal protection elements and ring terminal protection elements (FIG. 2B) that are electrically connected to the common ground spring (s) 22. Preferably, the tip terminal protection elements and the ring terminal protection elements are structurally and functionally identical to one another. Accordingly, only one such gas tube assembly 18 is shown in FIG. 3 and will be described in detail herein. In the embodiment shown in FIG. 3, each gas tube assembly 18 comprises a gas tube 24, a failsafe ground 26, a fusible solder pellet 27, an MOV 28, and an MOV spring 29 having a first end 31 and a second end 33. While the gas tube assembly 18 is shown and described in the exemplary embodiment provided herein, it will be readily apparent to those of skill in the art of surge protector design that the gas tube 24 and the MOV 28 may be replaced by any known protection device, including but not limited to, a solid state device, such as a thyristor or bidirectional voltage switch. A pocket 30 (FIG. 4) formed in the housing 12 adjacent the internal cavity holds the MOV spring 29 in position apart from the failsafe ground 26, thereby preventing the occurrence of a short-circuit between the line terminal 14 and the ground terminal 20 through the MOV spring 29, the ground spring(s) 22, and the ground stud 19. The gas tube assembly 18 is electrically connected between the line terminal 14 and the ground spring(s) 22, which in turn is (are) electrically connected to the ground stud 19. The ground stud 19 in turn is electrically connected to the ground terminal 20. Thus, each conductor secured on a tip or ring line terminal 14 between the fasteners 13 and the spacers 15 is electrically connected to the ground terminal 20 through the corresponding gas tube assembly 18, the ground spring(s) 22, the ground stud 19, and the ground terminal 20.

In the embodiment shown and described herein, the gas tube 24 is disposed between the first end 31 of the MOV spring 29 and the fusible solder pellet 27. The gas tube 24 has a first electrode 32 electrically connected to the fusible solder pellet 27, and a second electrode 34 spaced from the first electrode 32 that is electrically connected to the first end 31 of the MOV spring 29. The fusible solder pellet 27 is disposed between the first electrode 32 of the gas tube 24 and the failsafe ground 26. As previously mentioned, the failsafe ground 26 is electrically connected to the ground spring(s) 22, which in turn is (are) electrically connected to the ground stud 19, and the ground stud 19 is electrically connected to the ground terminal 20. Accordingly, the surge protector 10 provides a first electrical ground path P1 (FIG. 5A) from the line terminal 14, through the first end 31 of the MOV spring 29, between the second electrode 34 and the first electrode 32 of the gas tube 24, through the fusible solder pellet 27, through the failsafe ground 26, through the ground spring(s) 22, through the ground stud 19, and to the ground terminal 20.

In the embodiment shown and described herein, the MOV 28 is disposed between the second end 33 of the MOV spring 29 and the failsafe ground 26. Accordingly, the surge protector 10 provides a second electrical ground path P2 (FIG. 5A) that is parallel to the first electrical ground path P1 from the line terminal 14, between the first end 31 and the second end 33 of the MOV spring 29, through the MOV 28, through the failsafe ground 26, through the ground spring(s) 22, through the ground stud 19, and to the ground terminal 20. As will be readily apparent to those skilled in the art of surge protector design, the locations of the gas tube 24 and the MOV 28 may be interchanged. Thus, the MOV 28 may be disposed between the first end 31 of the MOV spring 29 and the fusible solder pellet 27, while the gas tube 24 is disposed between the second end 33 of the MOV spring 29 and the failsafe ground 26. In this latter configuration, the first electrical ground path P1 will divert voltage surges through the MOV 28 and the second electrical ground path P2 will divert voltage surges through the gas tube 24.

In the embodiment shown and described herein, the fusible solder pellet 27 is disposed between the first electrode 32 of the gas tube 24 and the failsafe ground 26. The failsafe ground 26 comprises a shelf 36 and at least one leg 38 extending outwardly from the shelf 36 in the direction of the line terminal 14. Each leg 38 extends outwardly from the shelf 36 a distance that is greater than the thickness of the gas tube 24, but less than the combined thickness of the gas tube 24 and the fusible solder pellet 27. Thus, there is a gap less than the thickness of the fusible solder pellet 27 between the leg(s) 38 of the failsafe ground 26 and the line terminal 14. In the event of a sustained voltage surge, the gas tube 24 and/or the MOV 28 will overheat, and thereby cause the fusible solder pellet 27 to melt. Preferably, the fusible solder pellet 27 is made of a fluxed metal alloy having a predetermined melt temperature. An exemplary alloy is 60% tin (SN) and 40% lead (Pb), although other suitable alloys may be used. The fusible solder pellet 27 is preferably fabricated using a powder metallurgy process of pressing and sintering. The fusible solder pellet 27 may also include an additional amount of solid, non-corrosive, non-conductive rosin flux. The additional amount of flux is less than 15%, preferably less than 10%, and most preferably about 8%. The presence of the flux in the fusible solder pellet 27 assists the solder to flow and to adhere to the surrounding metal surfaces after melting. The melt temperature is selected such that the fusible solder pellet 27 will melt when the gas tube 24 and/or the MOV 28 reach a preselected temperature. The melt temperature of the fusible solder pellet 27 is determined by a number of factors, including but not limited to, the thermal transfer coefficients of the gas tube 24, the failsafe spring 26, the MOV 28, and the MOV spring 29, and the location of the fusible solder pellet 27 relative to the gas tube 24 and the MOV 28. It will be readily appreciated by those of skill in the art of surge protector design that the predetermined melt temperature of the fusible solder pellet 27 likewise depends on whether the MOV 28 acts as a back-up protection device in the event that the gas tube 24 fails (e.g., the gas from the gas tube 24 vents), or whether the MOV 28 operates in conjunction with the gas tube 24 in a hybrid protection device to improve the performance of the surge protector. Regardless, the selection of the predetermined melt temperature of the fusible solder pellet 27 is well known to those of skill in the surge protector art and forms no part of the present invention.

When the gas tube 24 and/or the MOV 28 overheats, the fusible solder pellet 27 melts and the mass of the fusible solder pellet 27 that produced the gap between the leg(s) 38 of the failsafe ground 26 and the line terminal 14 essentially disappears. As previously mentioned, the ground spring(s) 22 bias the failsafe ground 26 in the direction of the line terminal 14. Thus, the ground spring(s) 22 urges the leg(s) 38 of the failsafe ground 26 into electrical contact with the line terminal 14, thereby providing an electrical short circuit path P3 (FIG. 5B) between the line terminal 14 and the ground terminal 20. The electrical short-circuit path P3 is parallel to the first electrical ground path P1 and the second electrical ground path P2, and diverts voltage surges to ground from the line terminal 14, through the failsafe ground 26, through the ground spring(s) 22, through the ground stud 19, and to the ground terminal 20. As will be readily apparent to those skilled in the art of surge protector design, the fusible solder pellet 27 may instead be disposed between the MOV 28 and the failsafe ground 26. In this latter configuration, each leg 38 of the failsafe ground 26 extends outwardly from the shelf 36 a distance that is less than the thickness of the gas tube 24 so that there is a gap less than the thickness of the fusible solder pellet 27 between the leg(s) 38 of the failsafe ground 26 and the line terminal 14. In the event of a sustained voltage surge, the gas tube 24 and/or MOV 28 will overheat, and thereby cause the fusible solder pellet 27 to melt and the mass of the fusible solder pellet 27 that produced the gap between the leg(s) 38 of the failsafe ground 26 and the line terminal 14 to essentially disappear. As previously mentioned, the MOV spring 29 biases the MOV 28 and the fusible solder pellet 27 in the direction of the line terminal 14. Thus, the MOV spring 29 urges the leg(s) 38 of the failsafe ground 26 into electrical contact with the line terminal 14, thereby providing the electrical short-circuit path P3 between the line terminal 14 and the ground terminal 20 previously described. It should be noted that the line terminal 14 is preferably provided with a base 16 having an increased outer diameter for engaging the leg(s) 38 of the failsafe ground to ensure good electrical contact between the line terminal 14 and the failsafe ground 26. Flats 17 may also be formed on the base 16 of the line terminal 14 for positioning the line terminal 14 in the proper orientation relative to the failsafe ground 26, while at the same time reducing the outer envelope of the housing 12.

Figure 5A:
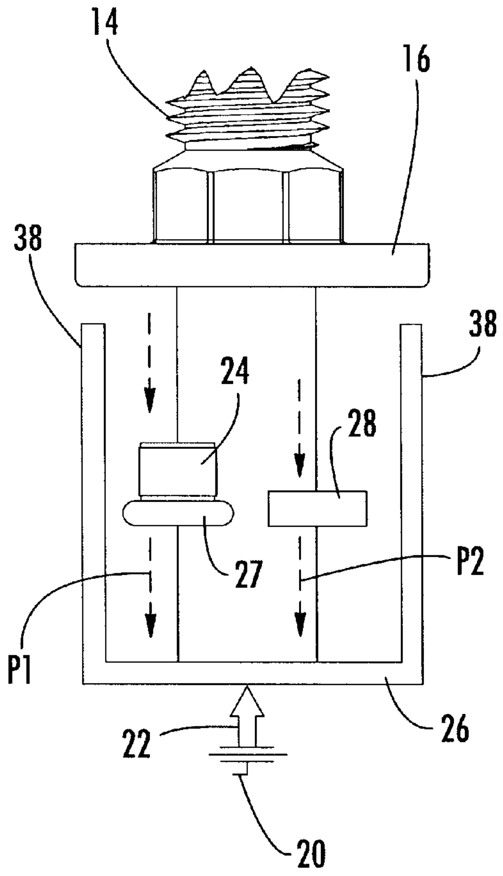
FIG. 5A is a schematic diagram illustrating the first electrical ground path and the second electrical ground path of the failsafe surge protector of FIG. 4.
Figure 5B:
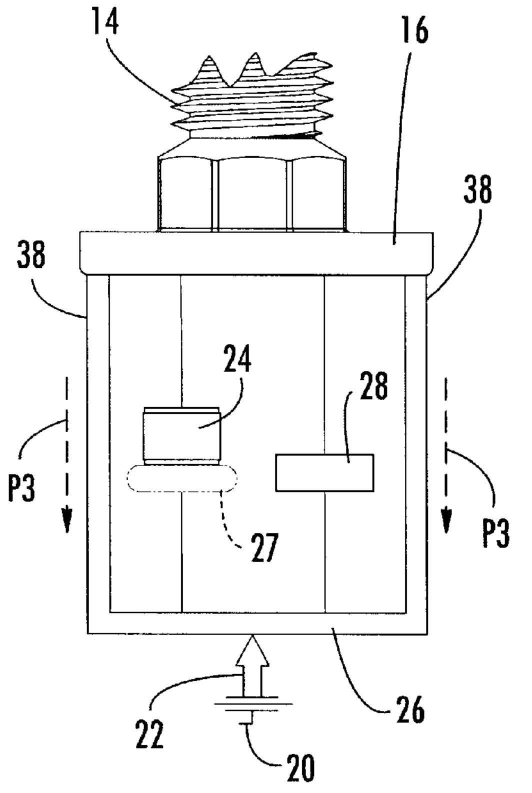
FIG. 5B is a schematic diagram illustrating the short circuit ground path of the surge protector of FIG. 4.
Figure 6B:
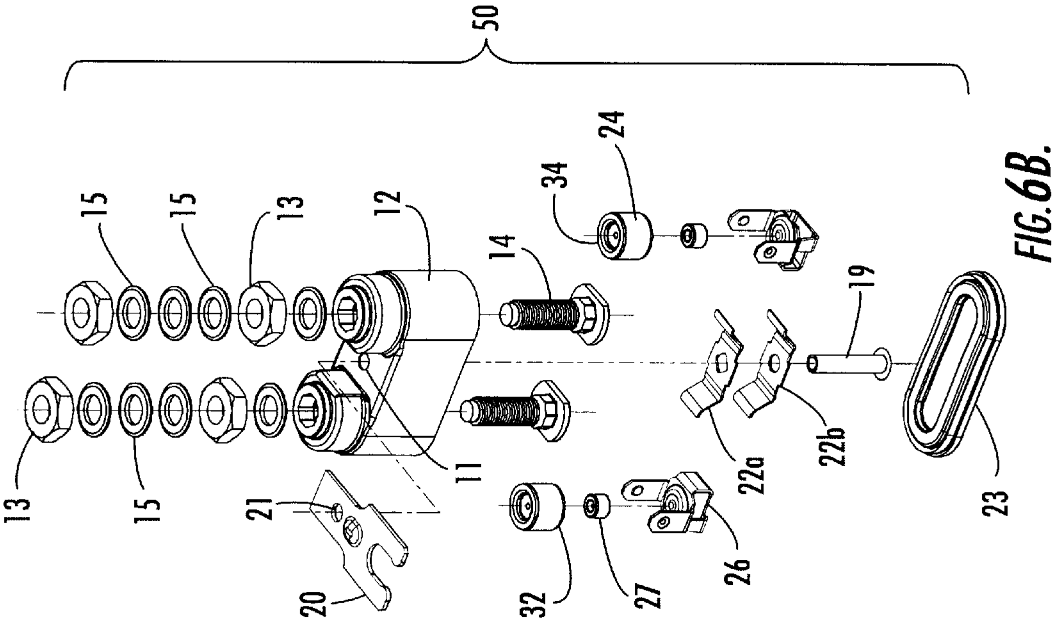
FIG. 6B is a fully exploded perspective view of the failsafe surge protector of FIG. 6A.
Figure 6A:
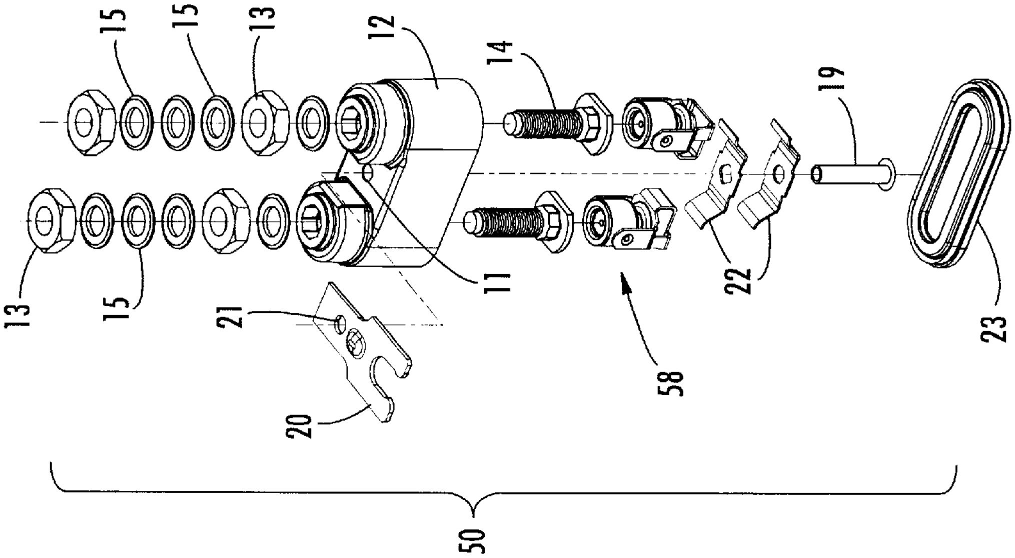
FIG. 6A is a partially exploded perspective view of another failsafe surge protector including a gas tube assembly having a reduced part count according to the invention.

The surge protector 10 thus provides three parallel electrical paths to divert voltage surges between one or more conductors on the tip and ring line terminals 14 and ground. The voltage surges may be carried to ground through the gas tube 24 and the fusible solder pellet 27 along the first electrical ground path P1, through the MOV 28 along the second electrical ground path P2, or may by-pass the gas tube 24, the fusible solder pellet 27, an the MOV 28 by traveling through the failsafe ground 26 along the electrical short-circuit path P3. The MOV 28 may act as a back-up protection device, or may operate in conjunction with the gas tube 24 as a hybrid protection device to improve the performance of the surge protector 10. FIG. 5A pictorially illustrates the first electrical ground path P1 through the gas tube 24 and the fusible solder pellet 27, and the parallel second electrical ground path P2 through the MOV 28. The first electrical ground path P1 diverts voltages surges from the line terminal 14 to the ground terminal 20 through the gas tube 24, the fusible solder pellet 27, the failsafe ground 26, and the ground spring(s) 22, which is represented by an arrow indicating the direction of the biasing force exerted by the ground spring(s) 22 on the failsafe ground 26. The second electrical ground path P2 diverts voltage surges from the line terminal 14 to the ground terminal 20 through the MOV 28, the failsafe ground 26, and the ground spring(s) 22. FIG. 5B pictorially illustrates the electrical short-circuit path P3. When the gas tube 24 and/or the MOV 28 overheats, the fusible solder pellet 27 melts (indicated by the broken lines) and the biasing force exerted by the ground spring(s) 22 causes the leg(s) 38 of the failsafe ground 26 to electrically contact the base 16 of the line terminal 14. The electrical short-circuit path P3 diverts voltage surges from the line terminal 14 to the ground terminal 20 directly through the failsafe ground 26 and the ground spring(s) 22.

The ground spring(s) 22 accomplish at least three different functions in the failsafe surge protector 10. Firstly, the ground spring(s) 22 function as a current-carrying element that electrically connects the gas tube assembly 18 with the ground stud 19. Secondly, the ground spring(s) 22 exert the biasing force on the failsafe ground 26 that causes the leg(s) 38 of the failsafe ground 26 to electrically contact the line terminal 14, and thereby complete the short-circuit electrical path between the line terminal 14 and the ground terminal 20. Thirdly, the ground spring(s) 22 hold the gas tube assembly 18 securely in position within the interior cavity defined by the housing 12. In the embodiment shown and described herein, there are two ground springs 22 having substantially identical contour and thickness, but made of different conductive materials. For example, a first ground spring 22*a* may be positioned immediately adjacent the failsafe ground 26 of the gas tube assembly 18 and formed from 0.012 inch thick C17200HT beryllium copper (BeCu). A second ground spring 22*b* may be positioned between the first ground spring 22*a* and the cover 23 and formed from 0.012 inch 1095 steel. As a result, the first ground spring 22*a* provides a primary 70% current-carrying capability and a secondary 40% biasing and holding force, while the second ground spring 22*b* provides a secondary 30% current-carrying capability and a primary 60% biasing and holding force. Since the ground springs 22*a* and 22*b* may be otherwise indistinguishable, the first ground spring 22*a* is provided with a square opening 35 for receiving the ground stud 19, while the second ground spring 22*b* is provided with a circular opening 37 for receiving the ground stud 19.

Another exemplary embodiment of a failsafe surge protector having a reduced part count according to the invention is shown in FIGS. 6A, 6B, 7, and 8. The surge protector, indicated generally at 50, includes identical sets of protection elements for protecting the tip and ring conductors on a telecommunications line against voltage surges. In particular, the surge protector 50 includes a set of tip terminal protection elements and a set of ring terminal protection elements, each comprising a protection element and a fusible element, as will be described. The surge protector 50 is similar in construction to the surge protector 10 and like reference numerals in the various views indicate like parts. Accordingly, only the differences between the surge protector 50 and the surge protector 10 will be described in detail herein. In particular, only the gas tube assembly 58 of the failsafe surge protector 50 differs from the gas tube assembly 18 of the failsafe surge protector 10. The remaining components of the failsafe surge protector 50 are structurally identical and function in the same maimer as the corresponding components of the surge protector 10. Thus, only the gas tube assembly 58 of the surge protector 50 will be described hereinafter in further detail.

Each gas tube assembly 58 (FIGS. 6A and 7) of the surge protector 50 comprises a gas tube 24, a failsafe ground 26, and a fusible solder pellet 27. Unlike gas tube assembly 18, gas tube assembly 58 does not comprise an MOV 28 and an MOV spring 29. Accordingly, the surge protector 50 does not provide a secondary protection element that acts as a back-up protection device for redundancy or a hybrid protection device to improve the performance of the surge protector 10. As previously described with respect to the gas tube assembly 18, the gas tube assembly 58 is electrically connected between the line terminal 14 and the ground spring(s) 22, which in turn is (are) electrically connected to the ground stud 19. The ground stud 19 in turn is electrically connected to the ground terminal 20. Thus, each conductor secured on a tip or ring line terminal 14 between the fasteners 13 and the spacers 15 is electrically connected to the ground terminal 20 through the corresponding gas tube assembly 58, the ground spring(s) 22, the ground stud 19, and the ground terminal 20.

In the embodiment shown and described herein, the gas tube 24 is disposed between the line terminal 14 and the fusible solder pellet 27. The gas tube 24 has a first electrode 32 electrically connected to the fusible solder pellet 27, and a second electrode 34 spaced from the first electrode that is electrically connected to the base 16 of the line terminal 14. The fusible solder pellet 27 is disposed between the first electrode 32 of the gas tube 24 and the failsafe ground 26. As previously mentioned, the failsafe ground 26 is electrically connected to the ground spring(s) 22, which in turn is (are) electrically connected to the ground stud 19, and the ground stud 19 is electrically connected to the ground terminal 20. Accordingly, the surge protector 50 provides an electrical ground path from the line terminal 14, between the second electrode 34 and the first electrode 32 of the gas tube 24, through the fusible solder pellet 27, through the failsafe ground 26, through the ground spring(s) 22, through the ground stud 19, and to the ground terminal 20.

In the embodiment shown and described herein, the failsafe ground 26 comprises a shelf 36 and at least one leg 38 extending outwardly from the shelf 36 in the direction of the line terminal 14. Each leg 38 extends outwardly from the shelf 36 a distance that is greater than the thickness of the gas tube 24, but less than the combined thickness of the gas tube 24 and the fusible solder pellet 27. Thus, there is a gap less than the thickness of the fusible solder pellet 27 between the leg(s) 38 of the failsafe ground 26 and the line terminal 14. In the event of a sustained voltage surge, the gas tube 24 will overheat, and thereby cause the fusible solder pellet 27 to melt. Preferably, the fusible solder pellet 27 is made of a fluxed metal alloy having a predetermined melt temperature. The melt temperature is selected such that the fusible solder pellet 27 will melt when the gas tube 24 reaches a preselected temperature. The melt temperature of the fusible solder pellet 27 is determined by a number of factors, including but not limited to, the thermal transfer coefficients of the gas tube 24 and the failsafe spring 26, and the location of the fusible solder pellet 27 relative to the gas tube 24. The selection of the predetermined melt temperature of the fusible solder pellet 27 is well known to those of skill in the surge protector art and forms no part of the present invention.

When the gas tube 24 overheats, the fusible solder pellet 27 melts and the mass of the fusible solder pellet 27 that produced the gap between the leg(s) 38 of the failsafe ground 26 and the line terminal 14 essentially disappears. As previously mentioned, the ground spring(s) 22 bias the failsafe ground 26 in the direction of the line terminal 14. Thus, the ground spring(s) 22 urges the leg(s) 38 of the failsafe ground 26 into electrical contact with the base 16 of the line terminal 14, thereby providing an electrical short circuit path between the line terminal 14 and the ground terminal 20. The electrical short-circuit path is parallel to the electrical ground path, and diverts voltage surges to ground from the line terminal 14, through the failsafe ground 26, through the ground spring(s) 22, through the ground stud 19, and to the ground terminal 20. The surge protector 50 thus provides two parallel electrical paths to divert voltage surges between one or more conductors on the tip and ring line terminals 14 and ground. The voltage surges may be carried to ground through the gas tube 24 and the fusible solder pellet 27 along the electrical ground path, or may by-pass the gas tube 24 and the fusible solder pellet 27 by traveling through the failsafe ground 26 along the electrical short-circuit path. As will be readily apparent to those skilled in the art of surge protector design, the fusible solder pellet 27 may instead be disposed between the line terminal 14 and the gas tube 24, while the gas tube 24 is disposed between the fusible solder pellet 27 and the failsafe ground 26. In this latter configuration, the operation of the failsafe surge protector 50 is unchanged in the event of a sustained voltage surge.

Figure 9:
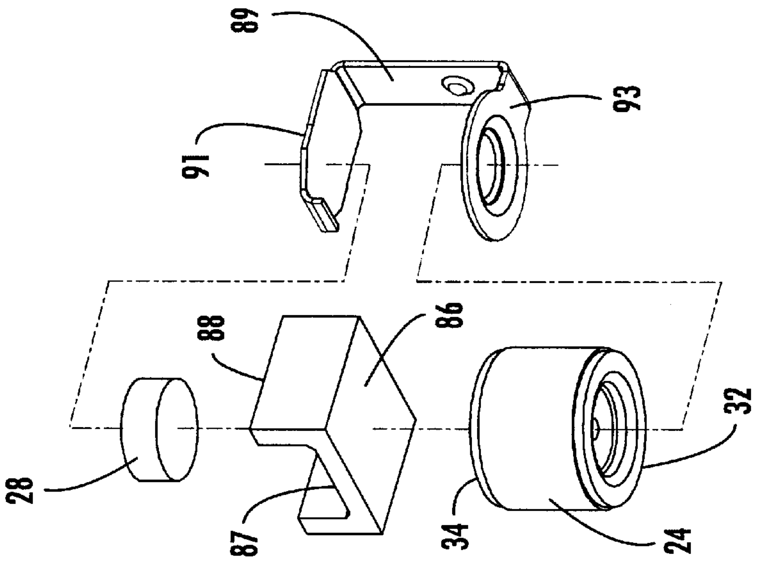
FIG. 9 is an exploded perspective view of another embodiment of a gas tube assembly for a failsafe surge protector having a reduced part count according to the invention.
Figure 7:
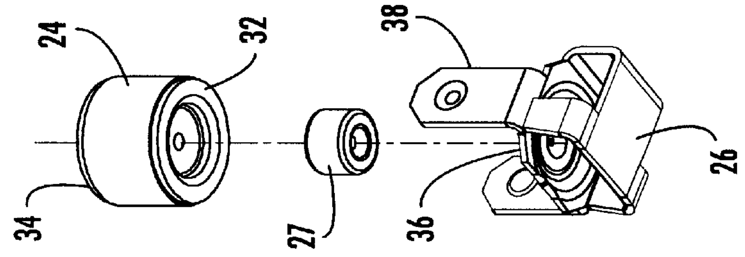
FIG. 7 is an exploded perspective view of the gas tube assembly of the failsafe surge protector of FIG. 6A.

Another embodiment of a gas tube assembly, indicated generally at 78, for a failsafe surge protector having a reduced part count according to the invention is shown in FIG. 9. The gas tube assembly 78 comprises a gas tube 24, a fusible element 87, an MOV 28, and a failsafe MOV spring 89. The gas tube 24, the fusible element 87, and the MOV 28 are disposed between the first end 91 and the second end 93 of the failsafe MOV spring 89, which exerts a compressive force on the gas tube 24 and the MOV 28. As shown and described herein, the MOV 28 is positioned adjacent the first end 91 of the failsafe MOV spring 89. The gas tube 24 has a first electrode 32 positioned adjacent the second end 93 of the failsafe MOV spring 89 and a second electrode 34 positioned adjacent the fusible element 87. The gas tube assembly 78 is disposed within the internal cavity defined by the housing 12 of the surge protector 10, 50 between the base 16 of the line terminal 14 and the ground spring(s) 22. Accordingly, the surge protector 10, 50 provides a first electrical ground path from the line terminal 14 through the fusible element 87, through the gas tube 24, through the second end 93 of the failsafe MOV spring 89, through the ground spring(s) 22, through the ground stud 19, and out to the ground terminal 20. Simultaneously, the surge protector 10, 50 provides a second electrical ground path parallel to the first electrical ground path from the line terminal 14 through the fusible element 87, through the MOV 28, between the first end 91 and the second end 93 of the failsafe MOV spring 89, through the ground spring(s) 22, through the ground stud 19, and out to the ground terminal 20.

In the embodiment shown and described herein, the fusible element 87 comprises a shelf 86 and at least one leg 88 extending outwardly from the shelf 86 in the direction of the line terminal 14. The length of the leg(s) 88 of the fusible element 87 is greater than the thickness of the MOV 28 so that there is a gap between the base 16 of the line terminal 14 and the first end 91 of the failsafe MOV spring 89. Preferably, the fusible element 87 is a solder pellet made of a fluxed metal alloy having a predetermined melt temperature, as previously described. When the gas tube 24 and/or the MOV 28 overheats, the fusible element 87 melts and the mass that produced the gap between the base 16 of the line terminal 14 and the first end 91 of the failsafe MOV spring 89 essentially disappears. As a result, the biasing force exerted by the ground spring(s) 22 on the gas tube assembly 78 causes the first end 91 of the failsafe MOV spring 89 to electrically contact the base 16 of the line terminal 14, while the compressive force exerted by the failsafe MOV spring 89 causes the second electrode 34 of the gas tube 24 to electrically contact the MOV 28. Accordingly, the surge protector 10, 50 provides a short-circuit electrical path from the line terminal 14 through the failsafe MOV spring 89, through the ground spring(s) 22, through the ground stud 19, and out to the ground terminal 20. As will be readily apparent to those skilled in the art of surge protector design, the locations of the gas tube 24 and the MOV 28 may be interchanged. Thus, the gas tube 24 may be disposed between the first end 91 of the failsafe MOV spring 89 and the fusible element 87, while the MOV 28 is disposed between the second end 93 of the failsafe MOV spring 89 and the fusible element 87. In this latter configuration, the first electrical ground path will divert voltage surges through the MOV 28 and the second electrical ground path will divert voltage surges through the gas tube 24.

It should be noted that the surge protector 10 and the surge protector 50 shown and described herein each have a fewer number of components than the known surge protector 110 shown and described herein. In particular, the innovative design of the surge protector 10 eliminates the voluted springs 116, the end caps 126, the ground cap 119, the retaining bands 130, and the need for a potting compound. The common ground support 122, however, is replaced by two ground springs 22, and the failsafe ground 26, the ground stud 19, and the cover 23 are added to the surge protector 10. Thus, the surge protector 10 has six (6) fewer components than the surge protector 110. The innovative design of the "no back-up" or "no MOV" surge protector 50 eliminates the voluted springs 116, the end caps 126, the MOV 128, the failsafe MOV spring 129, the ground cap 119, the retaining bands 130, and the need for a potting compound. The common ground support 122, however, is replaced by two ground springs 22, and the failsafe ground 26, the ground stud 19, and the cover 23 are added to the surge protector 50. Thus, the surge protector 50 has eight (8) fewer components than the surge protector 110. When the gas tube assembly 78 is substituted for the gas tube assembly 18 in the surge protector 10, the number of components is further reduced because the failsafe MOV spring 89 functions as both the MOV spring 29 to hold the gas tube assembly together and the failsafe ground 26 to electrically contact the base 16 of the line terminal 14 when the fusible element 87 melts. As will be readily apparent to one of skill in the art of surge protector design, the gas tube assembly 78 may be similarly substituted for the gas tube assembly 58 in the surge protector 50 to obtain a further reduction of components.

As a result of the reduced part count, the footprint of the failsafe surge protectors 10, 50 is the same or smaller than the failsafe surge protector 110. At the same time, the complexity of the assembly process and the cost to manufacture the surge protectors 10, 50 are reduced. In fact, the surge protector 10 and the surge protector 50 are identical except for the addition of the MOV 28 and the MOV spring 29 in the gas tube assembly 18 of the surge protector 10. Obviously, the gas tube assembly 78 may also be configured and sized to replace the gas tube assembly 18 in the surge protector 10 or the gas tube assembly 58 in the surge protector 50. Accordingly, a further cost reduction is achieved from the extensive use of common parts and common assembly processes in the manufacture of the surge protector 10 and the surge protector 50.

While the invention has been shown or described in only some of its forms, it should be apparent to those skilled in the art that it is not so limited, but is susceptible to various changes within departing from the scope of the invention.

That which is claimed is:

1. A surge protector having a conductive line terminal and a conductive ground terminal, the surge protector comprising:

a conductive first protection element electrically connected to the line terminal;

a conductive fusible element electrically connected to the line terminal, the fusible element having a predetermined melt temperature;

a conductive failsafe ground electrically connected to the first protection element and the fusible element; and a conductive ground spring electrically connected to the failsafe ground and the ground terminal, the ground spring biasing the failsafe ground in the direction of the line terminal to provide at least a first electrical ground path between the line terminal and the ground terminal until the fusible element melts and to provide an electrical short-circuit path between the line terminal and the ground terminal once the fusible element melts, the ground spring comprising a first ground spring and a second ground spring, the first ground spring formed of a material having a greater electrical conductivity than the second ground spring and the second ground spring formed of a materiel having a greater biasing force than the first ground spring.

2. A surge protector according to claim 1 wherein the first ground spring is formed from beryllium copper (BeCu) and the second ground spring is formed from a steel.

3. A surge protector according to claim 1 further comprising a conductive second protection element electrically connected to the line terminal and the failsafe ground, the ground spring biasing the failsafe ground in the direction of the line terminal to provide a second electrical ground path between the line terminal and the ground terminal until the fusible element melts.

4. A surge protector according to claim 3 wherein a conductor is electrically connected to the line terminal and the ground terminal is electrically connected to an earth ground and wherein the second electrical ground path diverts voltage surges on the conductor through the second protection element.

5. A surge protector according to claim 3 wherein the second electrical ground path is parallel to the first electrical ground path.

6. A surge protector according to claim 3 wherein the failsafe ground comprises a shelf and at least one leg extending outwardly from the shelf for electrically contacting the line terminal to provide the electrical short-circuit path.

7. A surge protector having a conductive line terminal and a conductive ground terminal, the surge protector comprising:

a conductive first protection element electrically connected to the line terminal;

a conductive fusible element electrically connected to the line terminal, the fusible element having a predetermined melt temperature;

a conductive failsafe ground electrically connected to the first protection element and the fusible element; and a conductive ground spring electrically connected to the failsafe ground and the ground terminal, the ground spring biasing the failsafe ground in the direction of the line terminal to provide at least a first electrical ground path between the line terminal and the ground terminal until the fusible element melts and to provide an electrical short-circuit path between the line terminal and the ground terminal once the fusible element melts;

a conductive second protection element electrically connected to the line terminal and the failsafe ground, the ground spring biasing the failsafe ground in the direction of the line terminal to provide a second electrical ground path between the line terminal and the ground terminal until the fusible element melts; and a spring having a first end electrically connected to the line terminal and a second end;

wherein the first protection element and the fusible element are disposed between the first end of the spring and the failsafe ground; and wherein the second protection element is disposed between the failsafe ground and the second end of the spring.

8. A surge protector according to claim 7 wherein the first protection element is a gas tube having a first electrode electrically connected to the fusible element and a second electrode spaced from the first electrode and electrically connected to the first end of the spring or the failsafe ground, and wherein the second protection element is a solid state protection device.

9. A surge protector having a conductive line terminal and a conductive ground terminal, the surge protector comprising:

a conductive first protection element electrically connected to the line terminal;

a conductive fusible element electrically connected to the line terminal, the fusible element having a predetermined melt temperature;

a conductive failsafe ground electrically connected to the first protection element and the fusible element; and a conductive ground spring electrically connected to the failsafe ground and the ground terminal, the ground spring biasing the failsafe ground in the direction of the line terminal to provide at least a first electrical ground path between the line terminal and the ground terminal until the fusible element melts and to provide an electrical short-circuit path between the line terminal and the ground terminal once the fusible element melts;

a conductive second protection element electrically connected to the line terminal and the failsafe ground, the ground spring biasing the failsafe ground in the direction of the line terminal to provide a second electrical ground path between the line terminal and the ground terminal until the fusible element melts; and a spring having a first end electrically connected to the line terminal and a second end;

wherein the first protection element is disposed between the first end of the spring and the failsafe ground; and wherein the second protection element and the fusible element are disposed between the failsafe ground and the second end of the spring.

10. A surge protector according to claim 9 wherein the first protection element is a gas tube having a first electrode electrically connected to the failsafe ground and a second electrode spaced from the first electrode and electrically connected to the first end of the spring, and wherein the second protection element is a solid state protection device.

11. A surge protector having a conductive line terminal and a conductive ground terminal, the surge protector comprising:

a conductive first protection element electrically connected to the line terminal;

a conductive fusible element electrically connected to the line terminal, the fusible element having a predetermined melt temperature;

a conductive failsafe ground electrically connected to the first protection element and the fusible element; and a conductive ground spring electrically connected to the failsafe ground and the ground terminal, the ground spring biasing the failsafe ground in the direction of the line terminal to provide at least a first electrical ground path between the line terminal and the ground terminal until the fusible element melts and to provide an electrical short-circuit path between the line terminal and the ground terminal once the fusible element melts; and a conductive second protection element electrically connected to the line terminal and the failsafe ground, the ground spring biasing the failsafe ground in the direction of the line terminal to provide a second electrical ground path between the line terminal and the ground terminal until the fusible element melts;

wherein the failsafe ground comprises a spring having a first end electrically connected to the line terminal and a second end; and wherein the first protection element, the fusible element, and the second protection element are disposed between the first end of the spring and the second end of the spring.

12. A surge protector according to claim 11 wherein the first protection element is a gas tube having a first electrode and a second electrode spaced from the first electrode and the second protection element is a solid state protection device.

* * * * *